(12) United States Patent
Lyons et al.

(10) Patent No.: US 11,849,675 B2
(45) Date of Patent: Dec. 26, 2023

(54) HEADER FOR A CROP HARVESTING MACHINE HAVING A TWISTED SIDE DRAPER

(71) Applicant: MacDon Industries Ltd., Winnipeg (CA)

(72) Inventors: Russell George Lyons, Winnipeg (CA); Bruce Robert Shearer, Winnipeg (CA)

(73) Assignee: MacDon Industries Ltd., Winnipeg (CA)

(*) Notice: Subject to any disclaimer, the term of this patent is extended or adjusted under 35 U.S.C. 154(b) by 1005 days.

(21) Appl. No.: 16/632,134

(22) PCT Filed: Jul. 19, 2018

(86) PCT No.: PCT/CA2018/050876
§ 371 (c)(1),
(2) Date: Jan. 17, 2020

(87) PCT Pub. No.: WO2019/018923
PCT Pub. Date: Jan. 31, 2019

(65) Prior Publication Data
US 2020/0229347 A1  Jul. 23, 2020

Related U.S. Application Data

(60) Provisional application No. 62/537,245, filed on Jul. 26, 2017.

(51) Int. Cl.
*A01D 61/02* (2006.01)
*A01D 61/00* (2006.01)
*A01D 34/14* (2006.01)

(52) U.S. Cl.
CPC ........... *A01D 61/02* (2013.01); *A01D 61/006* (2013.01); *A01D 34/14* (2013.01)

(58) Field of Classification Search
CPC ...... A01D 61/02; A01D 61/006; A01D 34/14; A01D 41/14; A01D 57/20
See application file for complete search history.

(56) References Cited

U.S. PATENT DOCUMENTS

| 635,264 A | * | 10/1899 | Lynch | ..................... | A01D 43/00 |
| | | | | | 56/188 |
| 1,509,124 A | * | 9/1924 | Bloor | ..................... | A01D 43/06 |
| | | | | | 56/6 |

(Continued)

FOREIGN PATENT DOCUMENTS

| CA | 3026913 C | * | 7/2020 | ........... A01D 34/283 |
| CN | 102065676 B | * | 11/2013 | ............. A01D 41/14 |
| EP | 3434095 A1 | * | 1/2019 | ............. A01D 41/14 |

*Primary Examiner* — Arpad F Kovacs
(74) *Attorney, Agent, or Firm* — Miller Canfield (57) ABSTRACT

A header for a crop harvester includes side drapers having a front edge adjacent the cutter bar and carrying crop to a discharge end roller at a center feed draper. A support arrangement carries the rear end of the discharge end roller to define an operating position in which an axis of the discharge end roller is at an angle to an axis of the outer end roller of the side draper with the rear end of the discharge end roller at a height below a height of the rear end of the outer end roller. This provides a main portion of the belt that lies in a common plane defined by an intermediate guide member and the outer end roller and a smaller portion of the draper belt between the guide member and the rear end of the discharge end roller which is twisted downwardly from the common plane.

21 Claims, 9 Drawing Sheets

(56) References Cited

U.S. PATENT DOCUMENTS

| | | | | |
|---|---|---|---|---|
| 3,304,699 | A * | 2/1967 | Koch | A01D 57/20 56/14.4 |
| 4,956,966 | A * | 9/1990 | Patterson | A01D 41/14 56/181 |
| 5,005,343 | A * | 4/1991 | Patterson | A01D 57/20 56/14.4 |
| 7,958,711 | B1 * | 6/2011 | Sauerwein | A01D 57/20 56/181 |
| 8,065,865 | B1 * | 11/2011 | Dow | A01D 57/20 56/181 |
| 8,087,224 | B1 * | 1/2012 | Coers | A01D 57/20 56/153 |
| 8,495,855 | B1 * | 7/2013 | Conrad | A01D 61/002 56/181 |
| 9,402,343 | B1 * | 8/2016 | Allochis | A01D 34/283 |
| 10,292,331 | B2 * | 5/2019 | Lauwers | A01D 61/002 |
| 10,349,580 | B2 * | 7/2019 | Barnett | A01D 69/03 |
| 2007/0193243 | A1 * | 8/2007 | Schmidt | A01D 57/20 56/181 |
| 2008/0271426 | A1 * | 11/2008 | Lohrentz | A01D 41/14 56/153 |
| 2009/0277145 | A1 * | 11/2009 | Sauerwein | A01D 41/141 56/208 |
| 2014/0041354 | A1 * | 2/2014 | Coon | A01D 41/14 56/158 |
| 2014/0059995 | A1 * | 3/2014 | Cormier | A01D 43/06 56/181 |
| 2019/0029177 | A1 * | 1/2019 | Enns | A01D 43/077 |

* cited by examiner

HEADER FOR A CROP HARVESTING MACHINE HAVING A TWISTED SIDE DRAPER

This invention relates to a header for a crop harvesting machine where a side draper includes a draper belt which is carried on a discharge end roller and an outer end roller where the rear end of the discharge end roller can be located at a different height from the rear end of the outer end roller. In a preferred arrangement this uses two side drapers for transferring the cut crop to a discharge opening. The arrangement can be used on a swather where the cut crop is discharged to the ground from the discharge end. The arrangement can also be used in a harvesting machine with a feeder house where there is provided a feed draper between the two side drapers running rearwardly to carry the crop to the feeder house of a harvester. While typically the machine is a combine harvester for seed crops, other types of harvesting machines can use the header, including a forage harvester.

BACKGROUND OF THE INVENTION

Headers for a crop harvesting machine generally comprises a main longitudinal support member in the form of an elongate tube which extends across substantially the full width of the header frame and defines a main structural member for the header frame. The tube carries a plurality of forwardly and downwardly extending support beams which include a first portion extending downwardly and a second portion attached to a lower end of the first portion and extending forwardly therefrom toward a forward end of the support beams. The cutter bar is attached to the forward end of the support beams and is thus held thereby in a position generally parallel to the main support tube.

Many headers are of a type in which the cutter bar is intended to be in a fixed rigid position relative to the main support tube so that the cutter bar is not intended to flex or float relative to the main structural tube in response to changes in ground contour.

This rigid type of header has the advantage that it allows more accurate control of the position of the fingers or bats of the reel relative to the cutter bar so as to more accurately control the crop as it is swept onto the cutter bar and the table rearwardly of the cutter bar.

In this rigid header type, therefore, the support beams extending forwardly from the main structural tube are substantially rigid and hold the cutter bar in fixed position.

Alternative types of header mount the cutter bar for floating or flexing movement relative to the main structural support tube. This type of header is used to provide an improved action in following the contour of the ground and is advantageous in some circumstances. Thus when cutting crops right at the ground it is desirable that the cutter bar of larger headers, greater than of the order of 20 feet, is somewhat flexible to follow the ground contour.

In U.S. Pat. No. 4,956,966 (Patterson) issued September 1990 and assigned to the present Assignee is disclosed a header which includes two side drapers for transporting the crop inwardly from the sides of the header toward the central discharge section at which is located a feed draper to carry the crop rearwardly to a discharge opening. The use of drapers can provide an arrangement which allows the header table to flex although the arrangement shown in the patent and the product manufactured in accordance with the patent provides a rigid header of the type described above. The header of Patterson includes a central link by which the position of the upper end of the header can be pulled toward or released from the supporting vehicle so as to change the angle of the frame of the header about an axis across the width of the header. A skid plate can be provided just behind the cutter bar which can run across the ground so that the change in angle of the header changes the angle of the cutter bar in front of the skid plate.

Many subsequent patents show headers where a flexibility is provided allowing the cutter bar to follow the ground contour while the frame remains attached to the propulsion vehicle. This causes relative movement between the cutter bar, the side drapers and the feed draper which must be accommodated while properly transferring the crop from the cutter bar to the harvester.

The header also includes at the discharge end of the two side drapers a feed draper having a front roller behind the cutter bar and parallel thereto and a rear roller spaced rearwardly from the front roller so that crop discharged from the discharge end falls onto the feed draper to be carried rearwardly.

In this arrangement using a feed draper, typically the rear roller of the feed draper is mounted on the harvester for movement upwardly and downwardly relative to the cutter bar and the front roller to accommodate changes in position between the cutter bar and the harvester.

SUMMARY OF THE INVENTION

According to the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a cutter bar arranged to move over the ground in a cutting action and carrying a cutter knife operable for cutting the crop as the header is moved forwardly across the ground for depositing the crop onto the table;

a draper comprising a draper belt mounted on rollers generally parallel to the forward direction so that the an upper run of the draper belt carries the crop transverse to the forward direction to a discharge end of the draper belt;

the draper belt having a front edge adjacent the cutter bar and a rear edge;

the rollers including a discharge end roller at the discharge end and an outer end roller at the end opposite the discharge end, each having a longitudinal roller axis;

the draper belt being wrapped around the discharge roller and around the outer end roller with a front end of each of the discharge and outer rollers at or adjacent the front edge of the belt and a rear end of the discharge and outer rollers at or adjacent the rear edge;

a first support arrangement supporting the front and the rear ends of the outer end roller;

a second support arrangement supporting the front and the rear ends of the discharge end roller;

the first and second support arrangements being mounted so that at least the rear end of the discharge end roller is movable in an upward and downward direction relative to the rear end of the outer end roller so that the discharge end roller has an operating position in which the axis of the discharge end roller is at an angle to a plane along the draper containing the axis of the outer end roller Preferably the rear end of the discharge end roller is movable to both a height below and a height above a height of the rear end of the outer end roller relative to the plane along the roller and including a position in which the axis of the discharge end roller lies in the plane along the draper.

Preferably therefore the second roller support arrangement holds the discharge end roller for movement of the axis thereof to raise and lower the rear end thereof relative to the front end thereof.

Preferably the second roller support arrangement is arranged to move the rear end of the discharge roller in a direction at a right angle to the plane along the draper.

This arrangement is particularly effective where a main portion of the draper belt extending from the outer roller inwardly lies in a plane which is inclined upwardly and rearwardly from the cutter bar. Thus the discharge roller can be arranged at an angle so that the rear end is lower than the plane of the rear end of the main portion. This has the effect that the crop material travelling along the belt adjacent the rear edge does not have to fall by such a large distance as it transitions off the end of the belt over the discharge end roller. In other words, the end portion of the belt adjacent the discharge end roller lies in a plane at an angle to the plane of the main portion of the belt so that it transitions gradually to the end of the belt at which the discharge roller is closer to the ground at the rear edge of the belt. In this arrangement the front end of the discharge roller lies in a common plane with front end of the outer roller. In some embodiments however the front end of the rollers and the front edge of the belt may move upwardly and downwardly to follow flexing of the cutter bar. This movement is independent of the change in angle of the discharge roller according to the present invention which causes the rear end to move to a plane lower than that of the main body of the rear of the belt for better guiding the crop as it discharges from the belt.

The movement of the rear end of the discharge roller allows that rear end to be attached to the adapter or mounting assembly which connects the header frame to the feeder house of the harvesting machine. In this way the rear end of the discharge roller and the rear roller of the feed draper can move together as a common structure. This common movement avoids the possibility of interference between components if they can move relative to one another.

Thus this arrangement can be used in a system where the roller support arrangement holds the discharge end roller for movement of the axis thereof to raise and lower the rear end thereof. In this way the rear end of the discharge roller can remain closer to the ground as the rear edge of the main portion of the belt moves upwardly and downwardly as the header moves upward and downward and tilts forwardly and rearwardly as it floats.

That is in some cases the roller support arrangement holds the discharge end roller for movement of the axis thereof to raise and lower the rear end thereof between a position in which the discharge end roller is parallel to the an end roller at the end of the draper belt opposite the discharge end so that the draper belt lies in a common plane and the above tilted operating position.

In order to hold the main portion of the belt in a common plane, preferably there is provided a guide member for the upper run of the draper belt at a position spaced from the discharge end where the guide member lies in a common plane with the outer end roller so that the main portion of the belt is carried by the outer end roller and the guide in the common plane and a smaller portion of the draper belt between the guide member and the discharge end roller is twisted from this common plane.

As defined above typically the roller support arrangement is arranged to move the rear end of the discharge roller transverse to the plane of the belt. However the movement of the rear end of the roller may pivot around an axis moving in an arc around the guide so that the distance from the guide to the rear end of the discharge roller remain constant and equal to the distance of the guide to the front end of the roller so maintain accurate tracking of the belt on the outer and discharge end rollers.

Preferably the guide member comprises a roller but it can simply be formed by a stationary guide surface lying typically at right angles to the direction of movement of the belt.

In some cases the guide member may extend only part way from the rear edge of the draper belt and stops short of the front edge. This allows the front edge of the belt to lie in a straight line from the front end of the outer end roller to the front end of the discharge end roller while the rear part of the belt closer to the rear edge is guided by the rollers and the guide member as the rear part changes angle at the guide.

This preferred arrangement thus allows the front edge of the draper belt to located at a fixed position adjacent the cutter bar to receive the crop therefrom.

In this arrangement typically the rear roller of the feed draper is mounted relative to the header for movement upwardly and downwardly relative to the cutter bar and the front roller to accommodate changes in position between the cutter bar and the propulsion vehicle or harvester. In this arrangement, the rear end of the discharge roller is preferably arranged to move upwardly and downwardly at least partly in response to the movement of the rear roller.

This can be done by an arrangement in which the rear end of the discharge roller is directly carried by a mounting fixed relative to the rear roller so as to directly follow the movement of the rear roller. However there can be other mechanical or other connections where some movement is communicated to the rear end of the discharge roller to partly take up changes in position of the rear roller of the feed draper. For example the rear end of the discharge end roller may be primarily in its lowered position out of the plane of the belt and may be raised simply by a stop member when the height of the rear roller of the feed draper raises above a certain location. The intention of course is to keep the distance of the rear end of the discharge roller as close as possible or sufficiently close to the feed draper to obtain improved transfer while avoiding undue complexity.

It will be appreciated that in a header of this type typically a main portion of the draper belt lies extending from the outer roller inwardly lies in a plane which is inclined upwardly and rearwardly from the cutter bar. Also typically the discharge end roller overlies the edge of the feed draper.

According to another aspect of the invention there is provided a crop harvesting header comprising:

a main frame structure extending across a width of the header for movement in a forward direction generally at right angles to the width across ground including a crop to be harvested;

a mounting assembly for carrying the main frame structure on a propulsion vehicle;

a cutter bar arranged to move over the ground in a cutting action and carrying a cutter knife operable for cutting the crop as the header is moved forwardly across the ground for depositing the crop onto the table;

a draper comprising a draper belt mounted on rollers generally parallel to the forward direction so that the an upper run of the draper belt carries the crop transverse to the forward direction to a discharge end of the draper belt;

the draper belt having a front edge adjacent the cutter bar and a rear edge;

the rollers including a discharge end roller at the discharge end and an outer end roller at the end opposite the discharge end, each having a longitudinal roller axis;

the draper belt being wrapped around the discharge roller and around the outer end roller with a front end of each of the discharge and outer rollers at or adjacent the front edge of the belt and a rear end of the discharge and outer rollers at or adjacent the rear edge;

a first support arrangement supporting the front and the rear ends of the outer end roller;

a second support arrangement supporting the front and the rear ends of the discharge end roller;

the support arrangement supporting the front and the rear ends of the discharge end roller providing an operating position of the discharge end roller in which the axis of the discharge end roller is at an angle to a plane along the draper containing the axis of the outer end roller with the rear end of the discharge end roller below the plane.

This arrangement can be used in a swather header where the crop material when discharged from the discharge end roller simply falls to the ground. In this case the discharge end roller may be fixed as there is typically less requirement for its height at the rear end to be adjusted. This arrangement provides the discharge end roller at an angle closer to the horizontal plane of the ground to reduce the change in discharge height from the front of the discharge roller to the rear.

BRIEF DESCRIPTION OF THE DRAWINGS

One embodiment of the invention will now be described in conjunction with the accompanying drawings in which.

DETAILED DESCRIPTION

Figure 1:
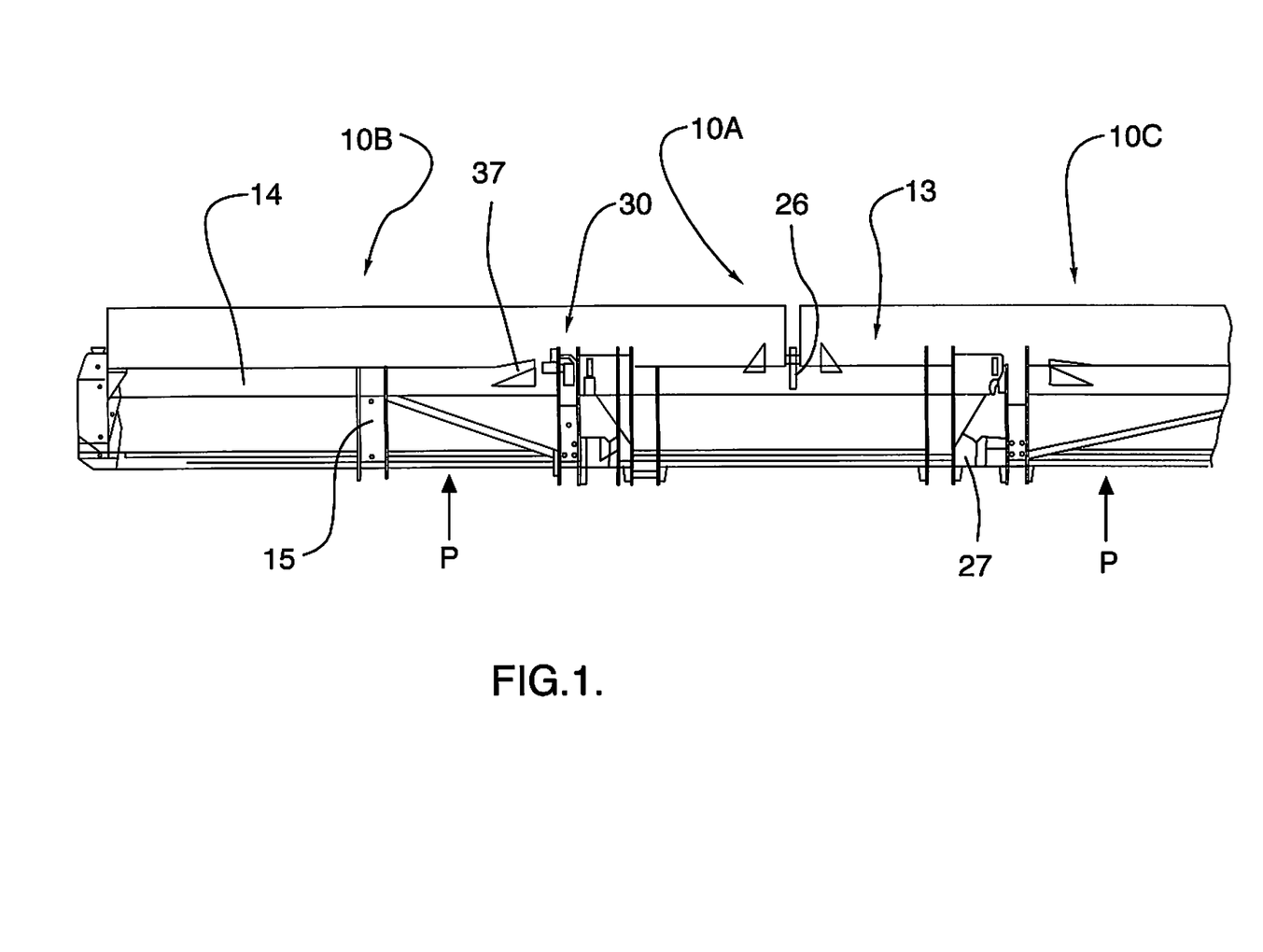
FIG. 1 is a schematic rear elevational view of a conventional header for use with the combine harvester which acts as a propulsion vehicle, with the associated adapter and the reel being omitted for convenience of illustration, to place the present invention in context.
Figure 2:
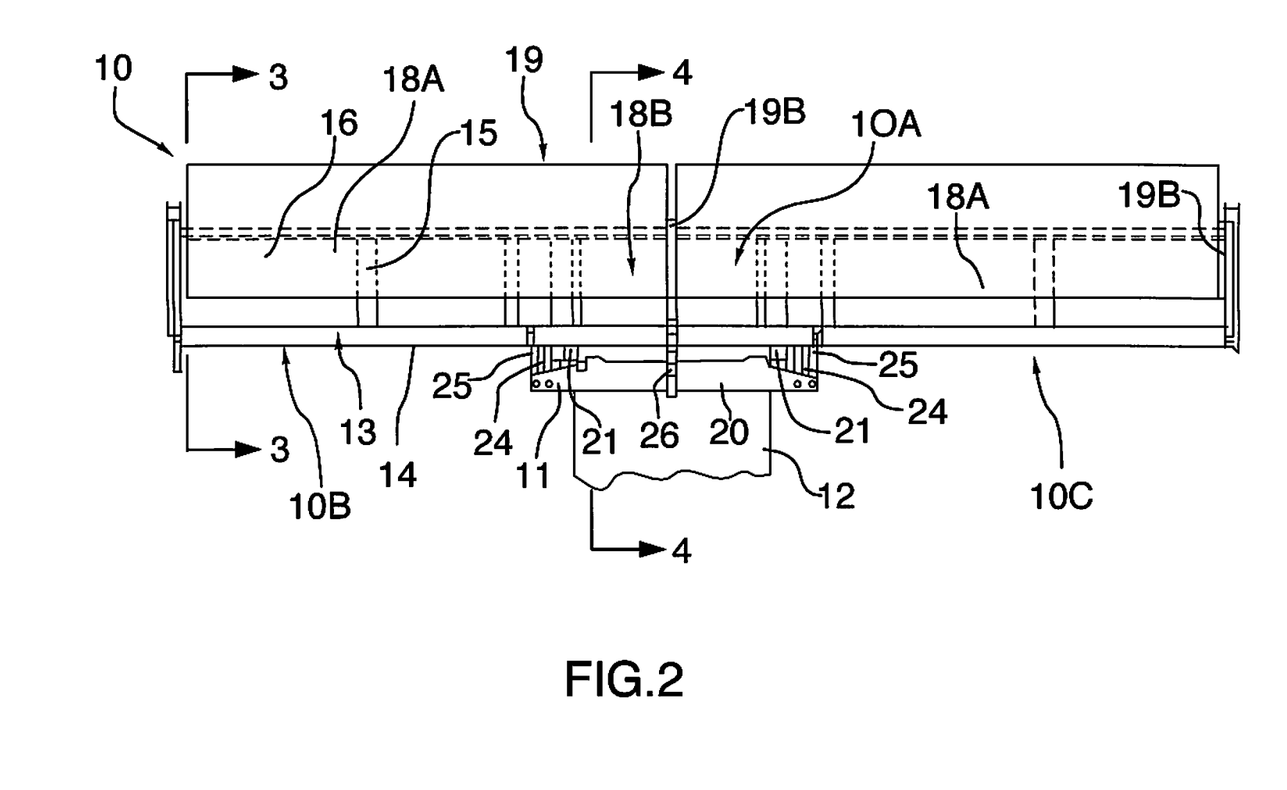
FIG. 2 is a schematic top plan view of the header of FIG. 1.
Figure 3:
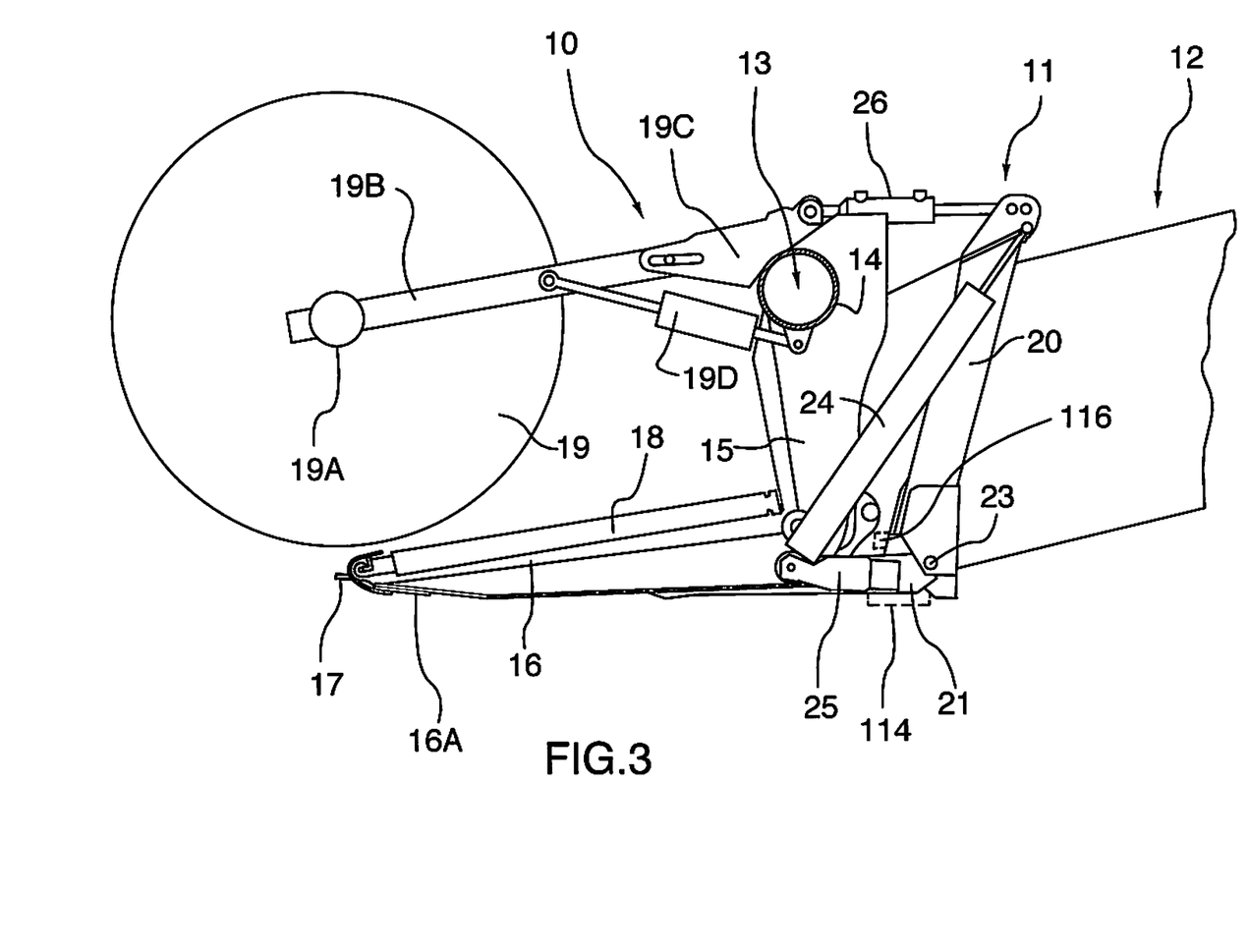
FIG. 3 is a cross sectional view along the lines 3-3 of FIG. 2 showing the outer end roller.

FIGS. 1, 2 and 3 show in rear elevational view and in plan view respectively the header 10 carried on an adapter 11 attached to the feeder house 12 of a combine harvester. In FIG. 1 the adapter is omitted for convenience of illustration.

The header 10 includes a frame 13 defined by a main rear beam 14 and a plurality of downwardly and forwardly extending arms 15 which extend downwardly from the beam 14 and then forwardly underneath a table 16 which extends across the header. At the forward end of the table 16 is provided a cutter bar 17. On top of the table 16 is provided a draper transport system 18 which carries the crop from the cutter bar across the header to a discharge location at the feeder house 12. The draper thus include two side drapers 18A extending from respective ends of the header inwardly toward the feeder house and a center adapter section 18B which acts to feed the crop from the side drapers 18A rearwardly to the feeder housing.

The header further includes a reel 19 including a beam on which is mounted a plurality of reel bats (not shown) which are carried on the beam for rotation with the beam around the axis of the beam. The beam is carried on reel support arms 19B which extend from the beam rearwardly and upwardly to a support bracket attached to the transverse main beam 14. The reel arms can be raised and lowered by hydraulic cylinders connected between the respective arm and the beam 14.

The adapter 11 provides a center support for the header at a center frame portion 10A and comprises a frame 20 which attaches to the feeder house 12 and carries at its lower end a pair of forwardly extending pivotal arms 21 which extend forwardly underneath respective ones of the frame members 15 of the header. The pivotal arms 21 can pivot upwardly and downwardly about a respective pivot pins 23 each independently of the other arm. Each arm is supported by a respective spring 24 carried on a respective stub arm 25 attached to the respective arm 21. Thus the spring 24 provides tension on the stub arm 25 pulling it upwardly around the pin 23 which acts to pull up the respective arm 21 and provide a lifting force underneath the header at a lifting point partway along the respective frame member 15 and underneath the draper 18 and the table 16.

At the center of the adapter is provided a link 26 which extends from the frame 20 forwardly to the central bracket 19C of the beam arm support brackets. The link 26 is provided in the form of a hydraulic tilt cylinder which allows adjustment of the length of the cylinder thus pivoting the header forwardly and rearwardly about the support point of the arms 21 on the underside of the header. Thus the attitude of the header, that is the angle of the table 16 to the horizontal can be tilted by operation of the cylinder forming the link 26.

In addition the attitude of the header about an axis extending forwardly of the direction of movement that is at right angles to the transverse beam 14 is effected by the independent pivotal movement of the arms 21 provided by the springs 24 which act as a floatation system. In addition the whole header can float upwardly and downwardly on the springs 24 with the link 26 pivoting to accommodate the upward and downward movement and the arms 21 pivoting about the respective pin 23.

The table 16 provides behind the cutter bar 17 a skid plate 16A typically including a polymeric wear shield which is arranged to engage the ground. Thus upward force is provided from the ground which tends to lift the header taking weight off the support springs 24. In practice the springs are adjusted so that the springs act to support the majority of the weight of the header leaving a relatively small proportion of the weight to rest on the ground. Thus the header can float upwardly and downwardly as the ground provides areas of different height with one end of the header being movable upwardly independently of the other end by independent flexing of the springs 24. Thus the header tends to follow the ground level.

The header is formed in a number of sections which are independently pivotal each relative to the next about an axis parallel to forward movement and in which adjustment of the lifting force provided by the springs 24 is transferred to each of the sections proportionally so that each section can float upwardly and downwardly and each section applies a force to the ground which is proportional to the total force of the whole header.

Thus the beam 14 is divided into a number of separate pieces depending upon the number of sections of the header. In the embodiment shown there are three sections including a center frame portion or section 10A carried on the propulsion vehicle by the adapter or center support 11, a first wing frame portion or section 10B and a second wing frame portion or section 100. The center section 10A is mounted at the adapter so that the arms 21 extend into engagement with the center section. The wing sections are pivotally connected to the center section such that each can pivot upwardly and downwardly about a respective pivot axis generally parallel to the direction of movement.

Thus the beam 14 is split into three portions each co-operating with a respective one of the sections 10A, 10B and 10C and defining a main beam therefor. Each section of the beam 14 includes respective ones of the frame members 15 which support the respective portion of the table. Thus as best shown in FIG. 1, there is a break between the beam sections 14 of the center section 10A and one wing section 10B. The end most frame member 15A of the wing section 10B is arranged at the break. The end frame member 15B of the center section 10A is spaced inwardly from the break leaving space for a pivot coupling 27 extending from the frame member 15A to the frame member 15B and defining a pivot pin 27A lying on the pivot axis between the wing section 10B and the center section 10A. In a rear elevational view, the cutter bar 17 is also visible underneath the header at the forward end of the frame members 15 and at the front of the table 16.

In the embodiment shown the cutter bar 17 is split at a junction lying along the axis of a hinge pin so as to provide a pivot within the cutter bar allowing the cutter bar to bend at the junction.

In an alternative arrangement (not shown) the cutter bar can be formed in a manner which allows it to flex on the axis of the pin thus avoiding the necessity for a break in the cutter bar.

Thus the two sections 10A and 10B are supported each relative to the other for pivotal movement of the wing section 10B about an axis extending through the hinge pin and through the break in the cutter bar 17 so that the wing section is supported at its inner end on the center section but can pivot downwardly at its outer end so that the weight at the outboard end is unsupported by the center section and causes downward or counter clockwise pivotal movement of the wing section 10B.

The wing section 100 is mounted in an identical or symmetrical manner for pivotal movement about the other end of the center section 10A. The amount of pivotal movement allowed of the wing section relative to the center section about the axis of the pivot pin is maintained at a small angle generally less than 6° and preferably less than 4° as controlled by suitable mechanical stop members which are provided at a suitable location with the required mechanical strength to support the wing frame section against upward or downward movement beyond the stop members. Suitable stop members can be designed by a person skilled in the art and the details of the stop members are not described herein.

The outboard weight of the wing section 10B is supported on an interconnecting linkage 30 which communicates that weight from the inner end of the beam 14 of the section 10B through to the support for the center section 10A at the springs 24.

In general the linkage operates to transfer the outboard weight of the wing section inwardly to the center section and at the same time to balance the lifting force provided by the springs 24 so that it is proportionally applied to the center section and to the wing section.

Thus in general the header is attached to the combine feeder house using the float system described previously that supports the header so that it can be moved up when a vertical force about 1% to 15% of its weight is applied to the cutter bar from the ground. The reaction of the float linkage that typically supports 85% to 99% of the header weight on the header is used to balance the weight of the wings.

The system is designed so that if the operator sets the float so that the float system supports 99% of the header weight then the remaining 1% will be evenly distributed across the cutter bar. If the operator changes the float so that 85% is supported by the combine harvester then the remaining 15% would also be evenly distributed across the cutter bar without the operator making adjustments. Thus, not only is the total lifting force to each sections varied in proportion to the total lifting force but also that lifting force on each section is balanced across the width of section. As the sections are rigid between the ends, this requires that the lifting forces be balance between the ends to ensure the even distribution across the cutter bar of each section and thus of all the sections. This provides an arrangement in which the force required to lift the header is the same force at any location along the length of the cutter bar, whether that location is at the center section, at a junction between the center section and the wing section or at the wing section. This is achieved in this embodiment by the balancing system which transfers lifting force between the sections with the forces being balanced by a balance beam of the linkages 30.

The header frame sections and the reel sections are hinged and supported so that the reel will stay in approximately the same position relative to the cutter bar. Thus the balance beam as described in more detail hereinafter balances the lifting force applied to the ends of the center section relative to the lifting force which is applied to the outboard weight of the wing section so that the lifting force is even across the width of the header. Thus if a lifting force is applied by the ground or any other lifting mechanism for example merely manually lifting the header at a particular location across its width, that would cause the header to rise at that point and to fall at other points. The amount of force necessary to lift the header at that point will be the same as it is at other points and this lifting force can be varied for the total header and proportioned across the width of the header automatically by the balance beams as described hereinafter.

It will be appreciated that the inboard weight of the wing section is transferred through the pivot 27 to the outboard end of the center section and that weight is transferred directly to the balance beam. Also the outboard weight of the wing section is transferred through the linkages 30. Yet further a lifting force from the arm 21 is applied to the balance beam.

The whole support assembly including the linkages 30, the lift arm 21 and the springs 24 are arranged to provide a floating movement for each of the first and second frame portions that is the center and wing frame portions relative to each other and relative to the propulsion vehicle such that upward pressure from the ground on the skid element 16A which is greater in a downward force for a part of the weight of the header and supported by the lifting force tends to lift each of the center and wing frame portions relative to the propulsion vehicle.

The height of the header is primarily controlled by controlling the height of the feeder house 20 of the combine harvester relative to the ground using a height control mechanism. Typically the feeder house is pivotally supported on a main frame of the combine harvester and an actuator member is mounted between the feeder house and the main frame to raise and lower the feeder house.

The height of the main structure of the header is in turn supported for up and down movement relative to the adapter 11 by supporting the main frame structure on the pivot arms 21 which are supported for floating movement by the springs 24 by providing a total spring lifting force to the header. The linkages 30 in turn distribute this total spring force into a center lifting force $F_c$ which provides lift to the center frame section and the inboard ends of the wing frame sections pivotally coupled thereto as well as a first lifting force and a second lifting force acting upon the first and second wing frame sections respectively in a direction intending to cause the outboard ends of the wing frames to be raised upwardly.

The balance linkages 30 serve to balance the total lifting force provided by the combine harvester through the pivot arms 21 to the center lifting force at the forward ends of the balance beams 102 and the first and second lifting forces at the rear ends of the balance beams so as to vary the lifting forces as the total lifting force varies and so as to balance the lifting forces from the ground applied along the length of the skid element.

Figure 4:
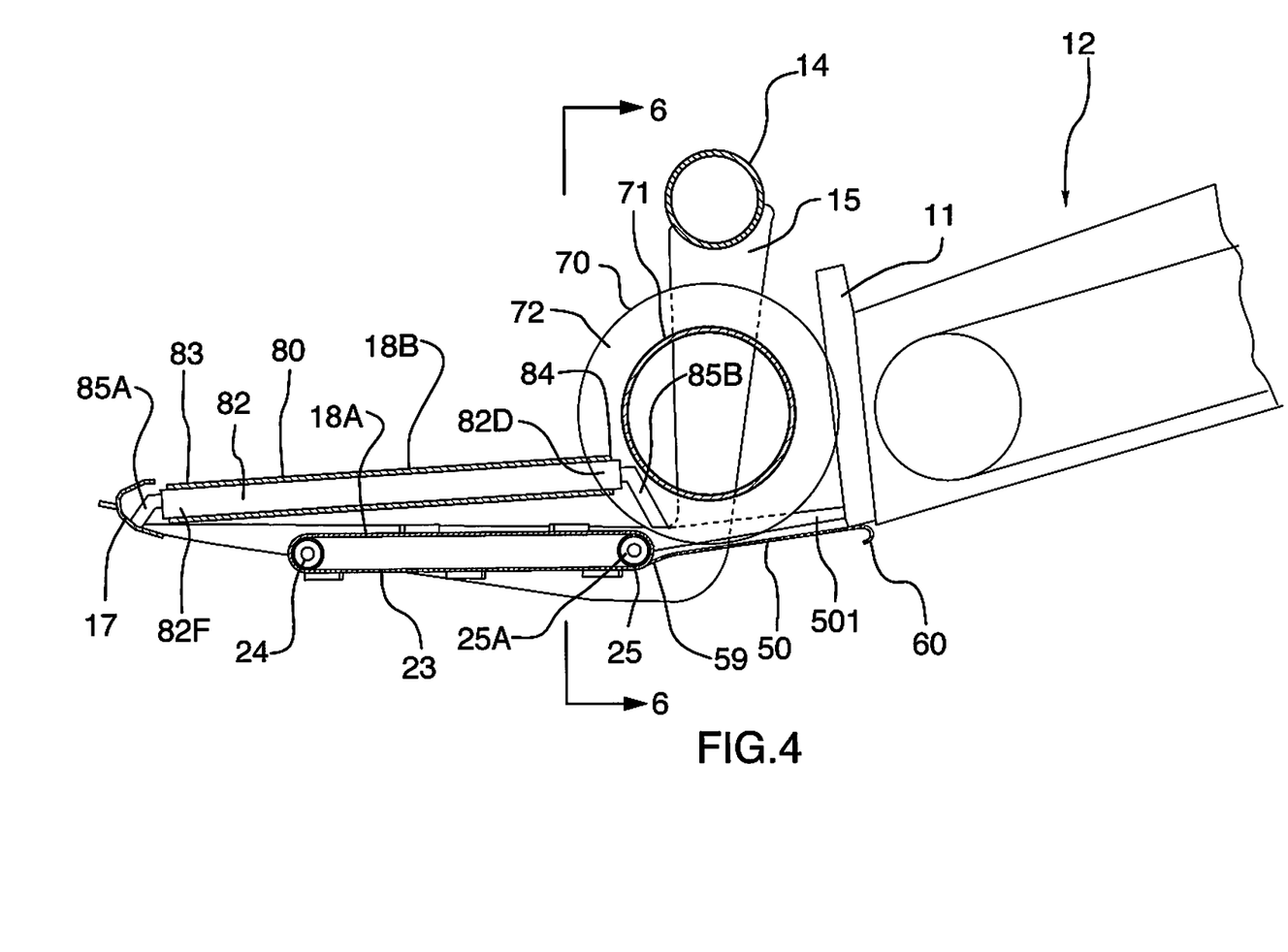
FIG. 4 is a cross sectional view along the lines 4-4 of FIG. 2.

As shown in FIG. 4, underneath and behind the rear end of the feed draper 18A is provided a guide sheet or pan 50 which extends from the rear end of the draper rearwardly through a rear position 59 behind the draper to a rear end 60 at the feeder house 12.

The feed draper 18A and the pan or guide sheet 50 are mounted on two parallel side arms 501 fixed to the adapter 11 which extend to the front end 59 or the pan 50. The feed draper 18A includes a belt 23 mounted on front roller 24 which is attached to the header frame rearward of the cutter bar. The rear roller 25 of the draper is mounted between the arms 501 rearward of the front roller.

Thus the arms 501 carry the rear roller 25 while the front roller 24 is carried by the header. The rear roller 25 of the draper 18A is thus mounted on the arms 501 and is fixed to the feeder house and the adapter 11 and therefore also the draper belt 23 flexes and twists to accommodate the relative movement. Between the header and the adapter as the header floats on the suspension springs and as the feeder house moves up and down as controlled by the height control system of the combine harvester.

The pan 50 has a width substantially equal to the width of the draper belt 23 so that the material discharged from the draper 18A across the full width of the draper is carried rearwardly over the pan 50 to the feeder house. The feed draper 18A is wider than the space between the side drapers 18B so that the feed draper extends underneath the side drapers to carry the crop therefrom and to reduce the possibility of crop back feeding underneath the side drapers.

The movement of the crop material to the feeder house is assisted by a rotary feed member 70 carried above the pan 50 with a width substantially equal to the width of the pan 50. The rotary feed member 70 includes a drum 71 which carries on its outside surface two helical auger sections 72 arranged at respective ends of the drum 70 and arranged so that rotation of the drum in a counter clockwise direction acts to carry the crop material underneath the rotary feed member across the pan 50 and causes the crop material at the side edges of the pan 50 to be drawn inwardly toward a c.

The feed draper 18A is located between the side drapers 18B. Each of the side drapers includes a belt 80 mounted on rollers 81 and 82 generally parallel to the forward direction including an outer end roller 81 and an inner end roller 82 at the feed draper 18A so that the an upper run of the draper belt 80 carries the crop transverse to the forward direction to the discharge end of the draper belt. The draper belt 80 has a front edge 83 adjacent the cutter bar and a rear edge 84 adjacent the rear wall of the header. An end most portion 80A of the side draper 18B projects beyond the side frame and overlies the edge of the feed draper 18A.

Turning now to FIGS. 4 to 9, the arrangement with which the present invention is concerned is shown in more detail and relates to the rollers of the side drapers 18B including the discharge end roller 82 at the discharge end and the outer end roller 81 at the end opposite the discharge end around which the draper belt 80 is wrapped.

The present arrangement provides a support arrangement 85 including front and rear components 85A, 85B supporting the front and the rear ends of the discharge end roller 82. The support 85B is attached to the adapter at the front end of the arms 501. The support 85A is attached to the header adjacent the cutter bar and across the arms 15. Thus the support 85 is arranged so that the discharge end roller 82 has an operating position 82A shown in FIGS. 7 and 9 in which an axis 82C of the discharge end roller 82 is at an angle to an axis 81A of the outer end roller 81. Also as shown in the same figures the rear end 82D of the discharge end roller 82 is located at a height below a height of the rear end 81D of the outer end roller 81.

Figure 5:
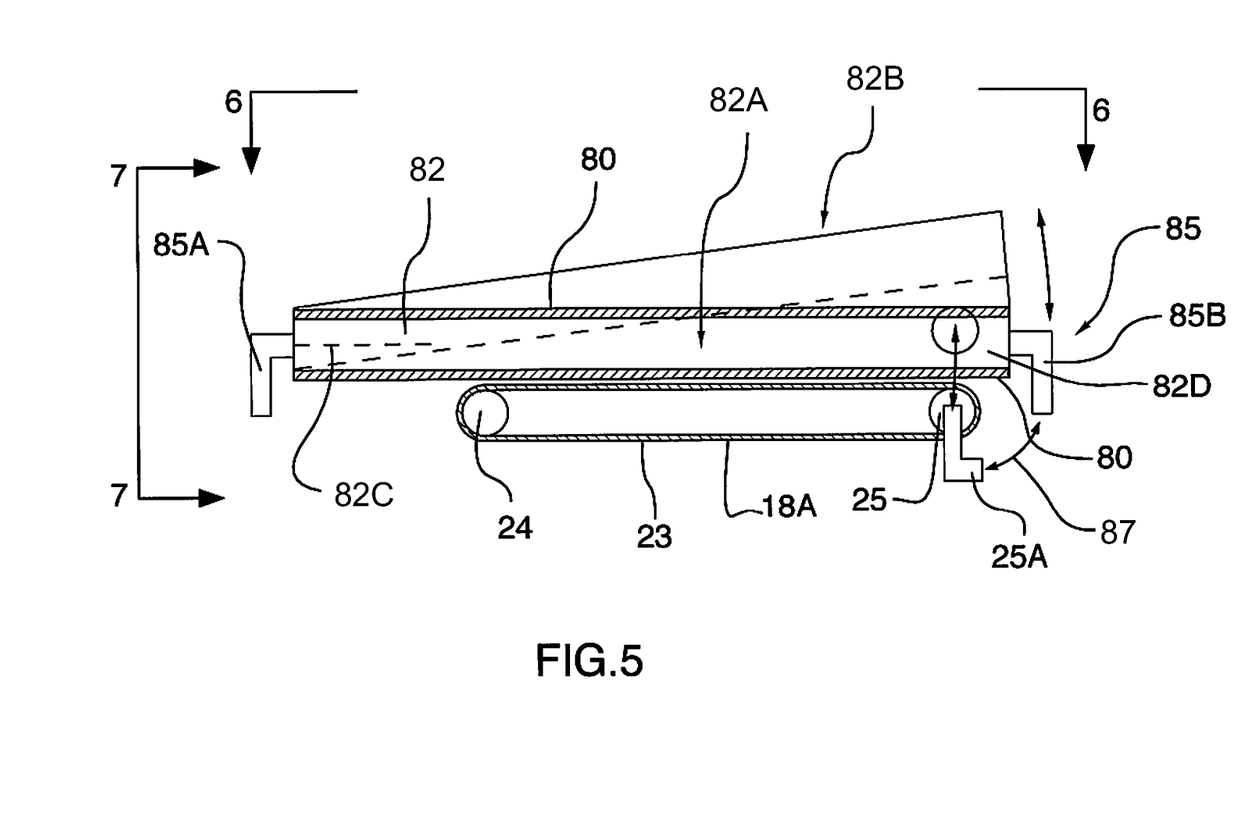
FIG. 5 is an enlarged cross sectional view of FIG. 4 showing only the feed draper and the discharge end roller of the side draper of the present invention.
Figure 6:
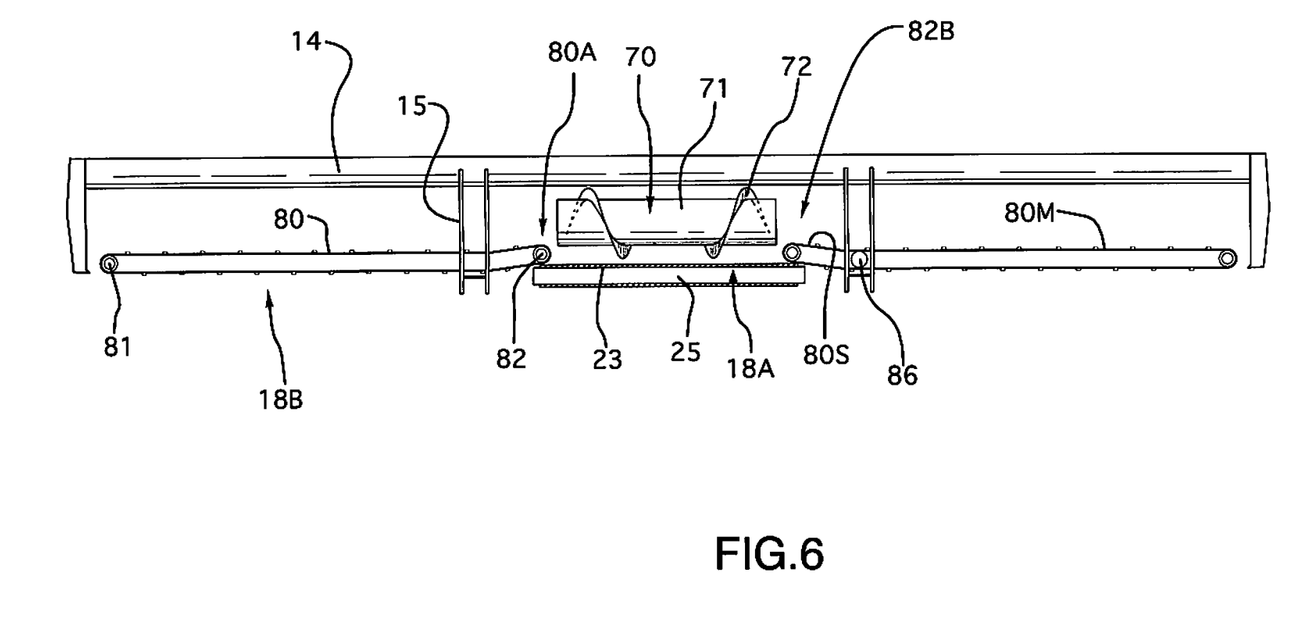
FIG. 6 is a cross sectional view along the lines 6-6 of FIG. 4 showing the side draper in a position where the feeder house has moved up relative to the header (or vice versa).
Figure 7:
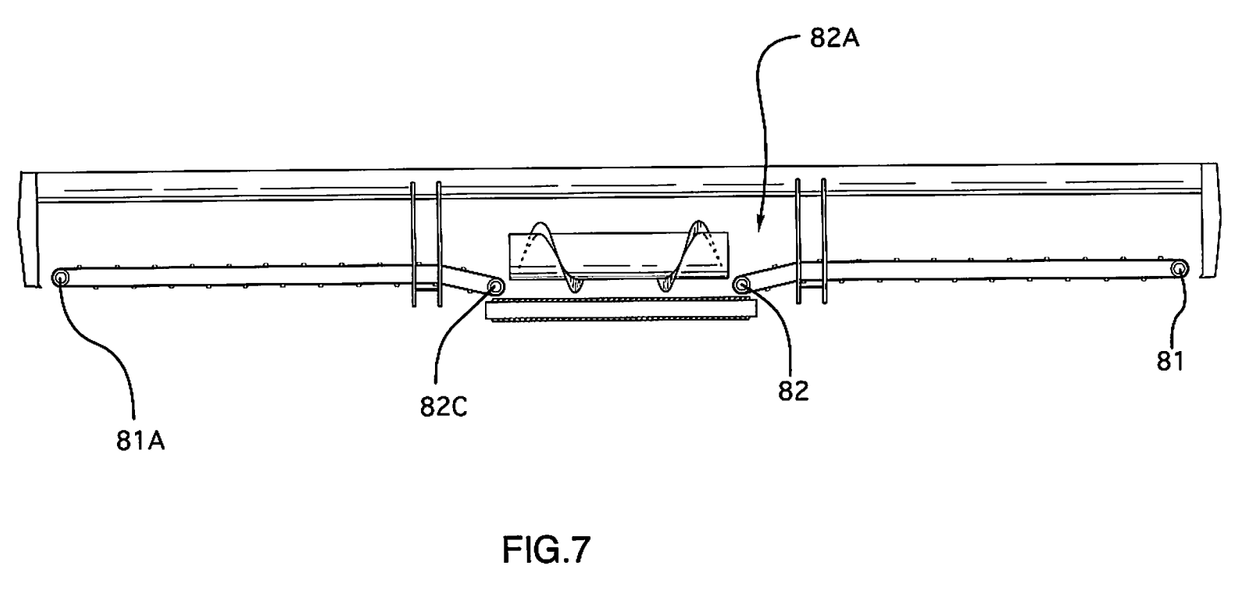
FIG. 7 is a cross sectional view along the lines 6-6 of FIG. 4 showing the side draper in a position where the feeder house has moved down relative to the header (or vice versa).

As shown in FIG. 5 and comparing FIGS. 6 and 7, the roller support arrangement 85 holds the discharge end roller 82 for movement of the axis thereof to raise and lower the rear end thereof between the positions shown at 82A and 82B. That is the roller support arrangement 85 holds the discharge end roller 82 for movement of the axis 82C thereof to raise and lower the rear end 82D thereof.

In FIG. 7 showing position 82A, the rear end 82D of the roller 82 is lowered to a position below the rear end of the roller 81. In FIG. 6 showing position 82B, the rear end 82D of the roller 82 is raised to a position above the rear end of the roller 81. The rear end 82D can also move through a position in which the axis of the discharge end roller 82 is parallel to the axis of the end roller 81 so that the draper belt 80 lies in a common plane along the full length of the belt.

In order to support the main part 80M of the belt 80 there is provided a guide member 86 for the upper run of the draper belt at a position spaced from the discharge end roller 82. This guide is parallel to the roller 81 and thus lies in a common plane with the outer end roller 81 so that the main portion 80M of the belt lies in a common plane defined by the guide member and the outer end roller. A smaller portion 80S of the draper belt between the guide member 86 and the discharge end roller 82 is twisted from the common plane as the rear end of the roller 82 moves up and down with the adapter. As shown the guide member 86 comprises a roller mounted at a rear 86A on the rear of the draper deck and cantilevered forwardly therefrom. The guide member 86 extends only part way from the rear edge of the draper belt and stops short of the front edge at a front end 86B.

The guide roller 86 can also be replaced by track portions which support the belt which are hinged to allow the change in angle at the required location to allow the belt to twist.

The roller support arrangement 85 and particularly the component 85B at the rear is arranged to move the rear end of the discharge roller generally vertically upwardly and downwardly thus at a right angle to the plane of the belt 80.

In the embodiment of FIG. 4, the rear end of the roller 82 is connected by the link 85B to the arms 501 of the adapter so that the rear end 82D moves upwardly and downwardly in conjunction with the adapter 11 and the rear roller 25 of the feed draper attached thereto. These components thus move in unison and move relative to the front end 82F of the roller 82 which is attached by the linkage 85A to the cutter bar 17.

The components can also be connected by a slotted link (not shown) so that they move in unison over a predetermined path length less than the total amount of movement and then the movement of the rear end of the roller is halted at an extreme position of the allowed movement.

This arrangement allows the use of a feed system including the belt 18A and the roller 70 which is of increased width relative to the opening at the frame through which the crop passes. This use of a wider feed system which may include a double width belt can better transfer the crop to the opening at the front of the feeder house, even though the feed system is wider than the feeder house. The provision of a rear end of the roller which can rise and fall with the adapter provides a geometry which can accommodate the extension of the feed draper beyond the width of the feeder house.

Figure 8:
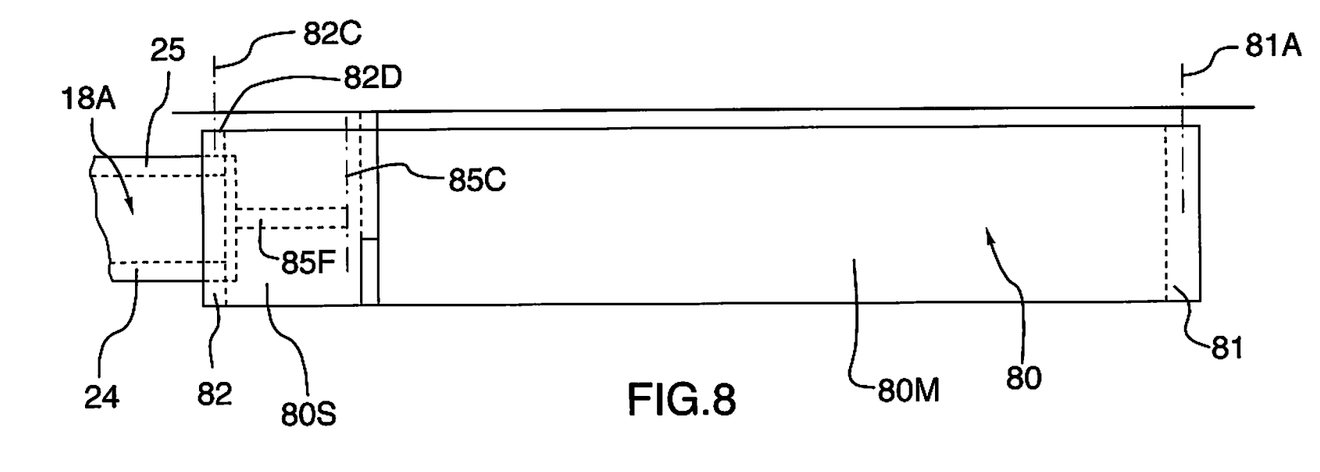
FIG. 8 is a top plan view of the components of FIG. 5.

In FIG. 8, the movement of the rear end 82D of the roller is effected by a linkage 85E which pivots around an axis 85C carried on a support so that it moves in an arc around the guide 86 so that the distance from the guide 86 to the rear end 82D of the discharge roller 82 remains constant during the movement and equal to the distance of the guide 86 to the front end 82F of the roller so maintain accurate tracking of the belt on the outer and discharge end rollers.

As explained above, there is provided at the discharge end roller 82 the feed draper 18A having a front roller 24 behind the cutter bar and parallel thereto and a rear roller 25 spaced rearwardly from the front roller so that crop discharged from the discharge end falls onto the feed draper to be carried rearwardly to the feeder house.

The rear roller 25 of the feed draper is mounted on a mounting 25A attached to the adapter 11 for movement relative to the header and the cutter bar as the header floats upwardly and downwardly. This causes the relative movement of the rear roller 25 relative to the front roller 24 to accommodate changes in position between the cutter bar and the feeder house. The rear end 82D of the discharge roller 82 is arranged to move upwardly and downwardly at least partly in response to the movement of the rear roller on a connecting linkage schematically indicated at 87. Thus the rear end of the discharge roller 82 is carried by the linkage 87 fixed relative to the rear roller 25 so as to directly follow the movement of the rear roller.

Figure 9:
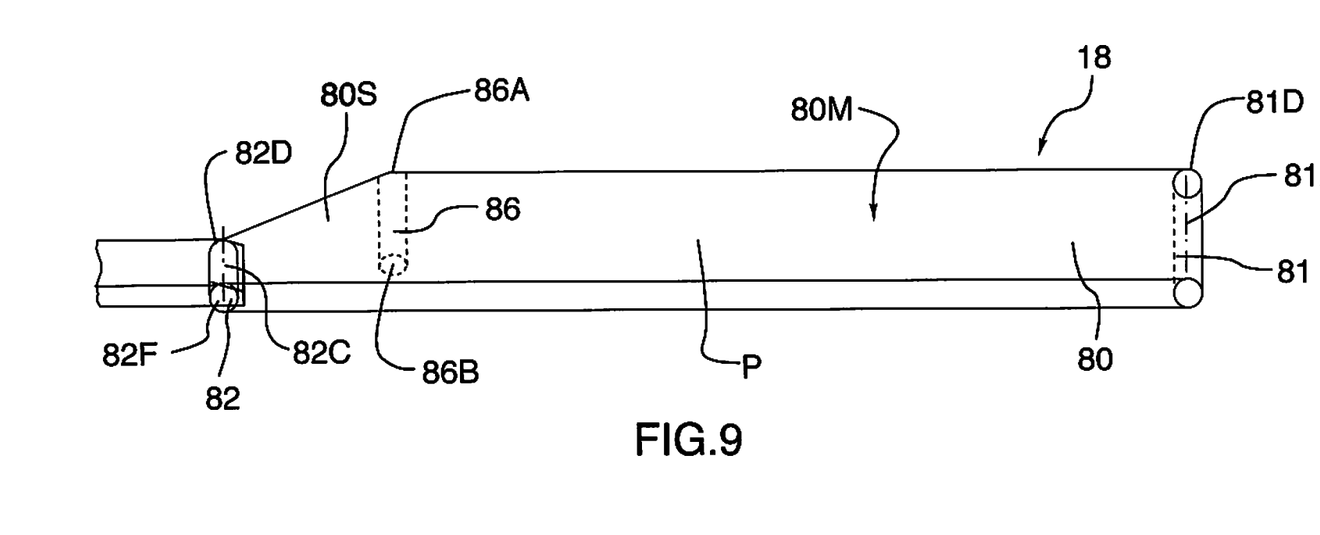
FIG. 9 is a front elevational view of the components of FIG. 5.

Thus the first and second support arrangements 85A and 85B are mounted so that at least the rear end of the discharge end roller 82 is movable in an upward and downward direction relative to the rear end of the outer end roller 81 so that the discharge end roller 82 has an operating position in which the axis 82C of the discharge end roller is movable to a position at an angle shown in FIG. 9 to a plane P along the draper containing the axis 81A of the outer end roller 81.

As shown in FIGS. 6 and 7, the rear end of the discharge end roller 82 is movable upwardly and downwardly to a height below a height of the rear end of the outer end roller and to a height above a height of the rear end of the outer end roller relative to the plane along the roller. Thus the roller support arrangement 85 for the roller 82 holds the discharge end roller 82 for movement of the axis 82C thereof to raise and lower the rear end thereof relative to the front end thereof. This passes through or includes a position in which the axis 82C of the discharge end roller lies in the plane P along the draper.

The guide member 86 lies in a common plane with the outer end roller 81 so that a main portion 80M of the upper run of the draper belt lies in the common plane P defined and a smaller portion 80S of the upper run of the draper belt between the guide member and the discharge end roller is twisted from the common plane.

The front edge 83 of the draper belt 80 is located at a fixed position adjacent the cutter bar to receive the crop therefrom. This edge 83 and the front end of the roller 82 is thus fixed and closely adjacent the cutter bar. In some cases the edge may move with the cutter bar as it flexes with the wings 10B and 100. In other cases the cutter bar may be mounted so that it moves by flexing relative to the front edge.

As shown in FIG. 4, the rear end 82D of the discharge roller 82 is carried by a mounting 85B fixed relative to the rear roller 25 and its mounting 25A by their common connection to the adapter so as to directly follow the movement of the rear roller.

As shown in FIGS. 6 and 7, in all positions of the roller 82, the discharge end roller overlies the edge of the feed draper.

As shown in FIG. 9, the main portion 80M of the draper belt extending from the outer roller inwardly lies in the plane P which is inclined upwardly and rearwardly from the cutter bar.

Figure 10:
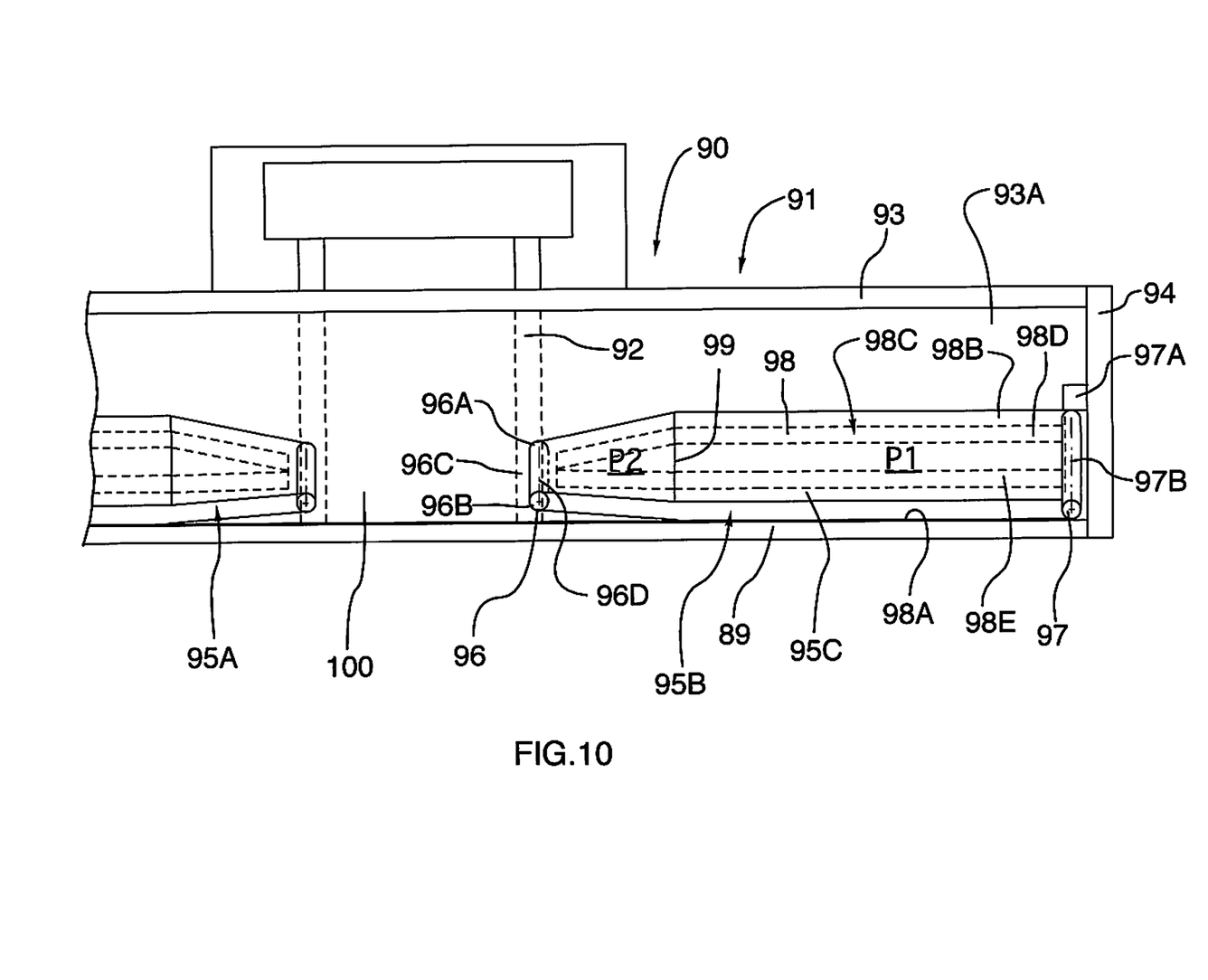
FIG. 10 is a schematic view from the front of a swather tractor according to the invention.

In another embodiment shown in FIG. 10, there is shown schematically a swather tractor 90 including a header 91 carried on front arms 92 of the tractor. The heard includes a front cutter bar 89 carried at the front of a frame 93 including end walls 94. A crop transportation system includes two drapers 95A and 95B carrying the cut crop to a center discharge 100 where the crop is discharged to the ground in the space between the drapers and behind the cutter bar 89.

Each draper 95A, 95B comprises a draper belt 98 mounted on rollers 96 and 97 generally parallel to the forward direction so that the an upper run of the draper belt carries the crop transverse to the forward direction to the discharge end of the draper belt at the opening 100. The draper belt 98 has a front edge 98A adjacent the cutter bar and a rear edge 98B adjacent a back sheet 93A.

The rollers thus include the discharge end roller 96 at the discharge end 100 and an outer end roller 97 at the end opposite the discharge end at the end sheet 94. The draper belt 98 is wrapped around the discharge end roller 96 and around the outer end roller 97.

The outer end roller is carried on a first support arrangement 97A attached to the end sheet supporting the front and the rear ends of the outer end roller and including drive systems for the outer roller. This supports the outer roller 97 in a plane P1 of a main portion 98C of the belt. The belt is supported by one or more guide tracks 98D, 98E carried on the frame 93 so as to maintain the belt in the plane P1.

The front and the rear ends 96B, 96A of the discharge end roller 96 are supported by a second support arrangement 96C forming part of the frame member 92 of the header. The support arrangement 96C supporting the front and the rear ends of the discharge end roller 96 support the discharge end roller in an operating position of which the axis 96D of the discharge end roller is at an angle to the plane P1 of the main portion 98C containing the axis 97B of the outer end roller 97.

The draper belt may curve through a smooth curvature as it transitions between the angle of the axis 97B and the axis 96D with the curvature defined by the tracks 98D, 98E. Alternatively the tracks may include a bend line 99 at which there is a sharp change in angle.

As shown in FIG. 10, the rear end 96A of the discharge end roller 96 is below the plane defined by the main or initial portion of the belt as defined by the axis 97B. this defines a plane P2 at the discharge end containing the axis 96D. This arrangement provides the discharge end roller 96 at an angle closer to the horizontal plane of the ground to reduce the change in discharge height from the front of the discharge roller to the rear. The angle of the roller 96 can thus be arranged as close as possible to horizontal but of course will change as the angle of the header is changed during operation.

In this arrangement therefore, the support arrangement supporting the front and the rear ends of the discharge end roller provide an operating position of the discharge end roller in which the axis of the discharge end roller is at an angle to the plane P1 along the draper containing the axis of the outer end roller, with the rear end of the discharge end roller at a height below a height of the rear end of the outer end roller. In this arrangement the roller support arrangement holds the discharge end roller in a fixed position relative to said plane along the draper and does not require the changes in angle which are provided in the embodiment described above. However the angle may also be adjustable, for example in dependence on the changes in angle of the header.

The invention claimed is:

1. A crop harvesting header comprising:
 a main frame structure extending across a width of the header for movement in a forward direction generally at right angles to the width across ground including a crop to be harvested;
 an attachment member for attachment of the main frame structure to a feeder house of a harvester;
 a cutter bar arranged to move over the ground in a cutting action and carrying a cutter knife operable for cutting the crop as the header is moved forwardly across the ground for depositing the crop onto the table;
 a draper comprising a draper belt mounted on rollers generally parallel to the forward direction so that an upper run of the draper belt carries the crop transverse to the forward direction to a discharge end of the draper belt;
 the draper belt having a front edge adjacent the cutter bar and a rear edge;
 the rollers including a discharge end roller at the discharge end and an outer end roller at the end opposite the discharge end, each having a longitudinal roller axis;
 the draper belt being wrapped around the discharge roller and around the outer end roller with a front end of each of the discharge and outer rollers at or adjacent the front edge of the belt and a rear end of the discharge and outer rollers at or adjacent the rear edge;
 a first support arrangement supporting the front and the rear ends of the outer end roller;
 a second support arrangement supporting the front and the rear ends of the discharge end roller;
 the first and second support arrangements being mounted so that at least the rear end of the discharge end roller is movable in an upward and downward direction relative to the rear end of the outer end roller so that the discharge end roller has an operating position in which the axis of the discharge end roller is at an angle to a plane along the draper containing the axis of the outer end roller.

2. The header according to claim 1 wherein the rear end of the discharge end roller is movable to a height below a height of the rear end of the outer end roller relative to the plane along the roller.

3. The header according to claim 1 wherein the rear end of the discharge end roller is movable to a height above a height of the rear end of the outer end roller relative to the plane along the roller.

4. The header according to any-preceding claim 1 wherein the second roller support arrangement holds the discharge end roller for movement of the axis thereof to raise and lower the rear end thereof relative to the front end thereof.

5. The header according to any-preceding claim 1 wherein the second roller support arrangement holds the discharge end roller for movement of the axis thereof to raise and lower the rear end thereof including a position in which the axis of the discharge end roller lies in the plane along the draper.

6. The header according to claim 1 wherein the second roller support arrangement is arranged to move the rear end of the discharge roller in a direction at a right angle to the plane along the draper.

7. The header according to claim 1 wherein there is provided a guide member for the upper run of the draper belt at a position spaced from the discharge end roller where the guide member lies in a common plane with the outer end roller so that a main portion of the upper run of the draper belt lies in a common plane defined by the guide member and the outer end roller and a smaller portion of the upper run of the draper belt between the guide member and the discharge end roller is twisted from the common plane.

8. The header according to claim 7 wherein the guide member comprises a roller.

9. The header according to claim 7 wherein the guide member comprises and both the front and rear ends of the outer end roller are fixedly attached to the main frame structure for common movement therewith.

10. The header according to claim 7 wherein the guide member extends only part way from the rear edge of the draper belt and stops short of the front edge.

11. The header according to claim 1 wherein the front edge of the draper belt is located at a fixed position adjacent the cutter bar to receive the crop therefrom.

12. The header according to claim 1 further comprising:
 a second draper symmetrical to the draper and feeding crop from a respective end of the header to a center feed section of the header;
 a feed draper having a front roller behind the cutter bar and parallel thereto and a rear roller spaced rearwardly from the front roller so that crop discharged from the discharge end of the draper and the second draper falls onto the feed draper to be carried rearwardly; and
 a suspension arrangement connecting the main frame structure to the attachment member for up and down floating movement of the main frame structure and the cutter bar thereon relative to the attachment member;
 wherein the rear roller of the feed draper is mounted relative to the attachment member for movement upwardly and downwardly relative to the cutter bar and the front roller to accommodate changes in position between the cutter bar and the feeder house caused by said up and down floating movement;

and wherein the rear end of the discharge roller is arranged to move upwardly and downwardly at least partly in response to the movement of the rear roller.

13. The header according to claim 12 wherein the rear end of the discharge roller is carried by a mounting fixed relative to the rear roller so as to directly follow the movement of the rear roller.

14. The header according to claim 12 wherein the discharge end roller overlies the edge of the feed draper.

15. The header according to claim 1 wherein a main portion of the draper belt extending from the outer roller inwardly lies in a plane which is inclined upwardly and rearwardly from the cutter bar.

16. The header according to claim 12 wherein the rear roller of the feed draper and the rear end of the discharge end roller of both the draper and the second draper are all connected to the attachment member for movement with the feeder house.

17. The header according to claim 12 wherein the front roller of the feed draper, the front end of the discharge roller of the draper and of the second draper are all connected to the main frame structure for movement therewith.

18. The header according to claim 12 wherein the main frame structure comprises a center section mounted on the attachment member and two wing sections mounted on the center section for pivotal movement about an axis generally parallel to the forward direction.

19. The header according to claim 1, further comprising a suspension arrangement connecting the main frame structure to the attachment member for up and down floating movement of the main frame structure and the cutter bar thereon relative to the attachment member, wherein the rear end of the discharge end roller is movable in an upward and downward direction to accommodate changes in position between the cutter bar and the feeder house caused by the up and down floating movement.

20. A crop harvesting header comprising:
a main frame structure extending across a width of the header for movement in a forward direction generally at right angles to the width across ground including a crop to be harvested;
a mounting assembly for carrying the main frame structure on a propulsion vehicle;
an attachment member for attachment of the main frame structure to a feeder house of a harvester;
a cutter bar arranged to move over the ground in a cutting action and carrying a cutter knife operable for cutting the crop as the header is moved forwardly across the ground for depositing the crop onto the table;
a draper comprising a draper belt mounted on rollers generally parallel to the forward direction so that an upper run of the draper belt carries the crop transverse to the forward direction to a discharge end of the draper belt;
the draper belt having a front edge adjacent the cutter bar and a rear edge;
the rollers including a discharge end roller at the discharge end and an outer end roller at the end opposite the discharge end, each having a longitudinal roller axis;
the draper belt being wrapped around the discharge roller and around the outer end roller with a front end of each of the discharge and outer rollers at or adjacent the front edge of the belt and a rear end of the discharge and outer rollers at or adjacent the rear edge;
a first support arrangement supporting the front and the rear ends of the outer end roller;
a second support arrangement supporting the front and the rear ends of the discharge end roller;
the second support arrangement supporting the front and the rear ends of the discharge end roller providing an operating position of the discharge end roller in which the axis of the discharge end roller is at an angle to a plane along the draper containing the axis of the outer end roller with the rear end of the discharge end roller at a height below a height of the rear end of the outer end roller.

21. The header according to claim 20 wherein the roller support arrangement holds the discharge end roller in a fixed position relative to said plane along the draper.

* * * * *